No. 616,339. Patented Dec. 20, 1898.
W. A. LAYMAN.
AMMETER FOR ALTERNATING ELECTRIC CURRENTS.
(Application filed Apr. 4, 1898.)
(No Model.)
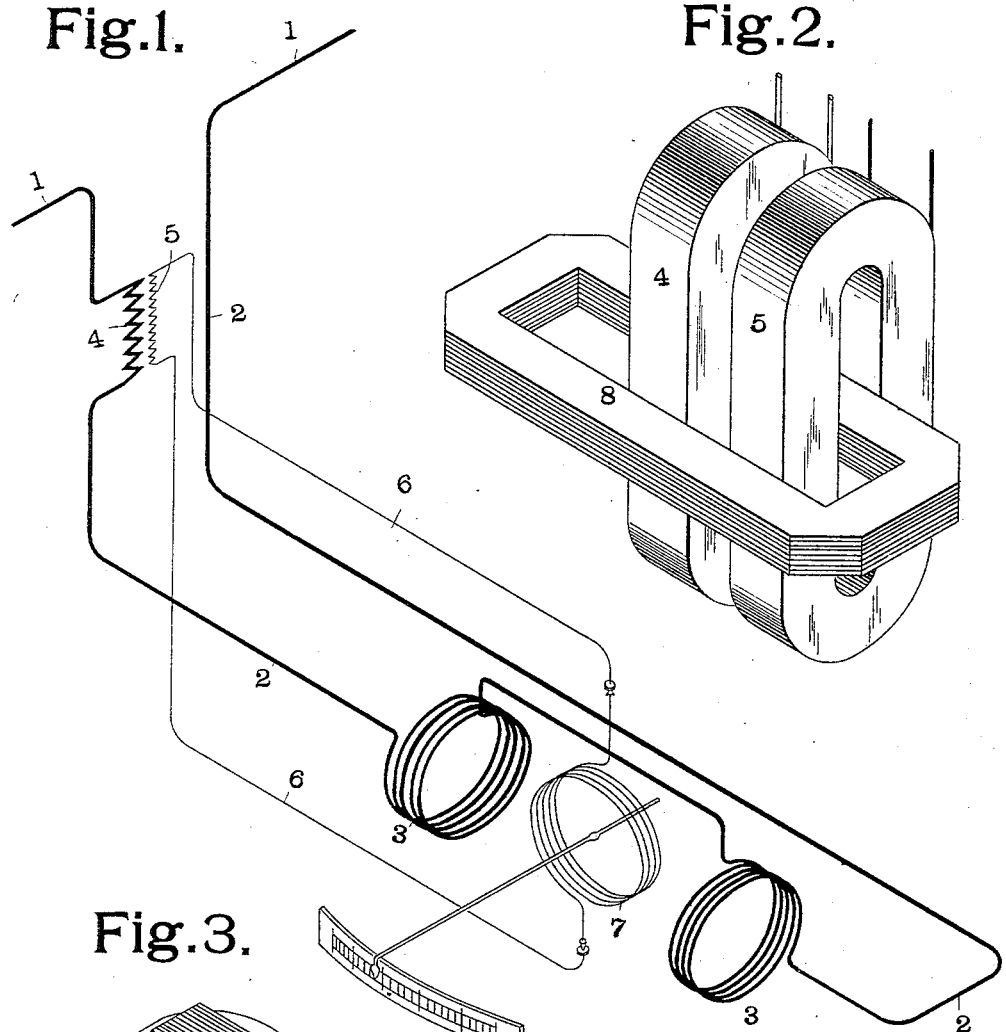
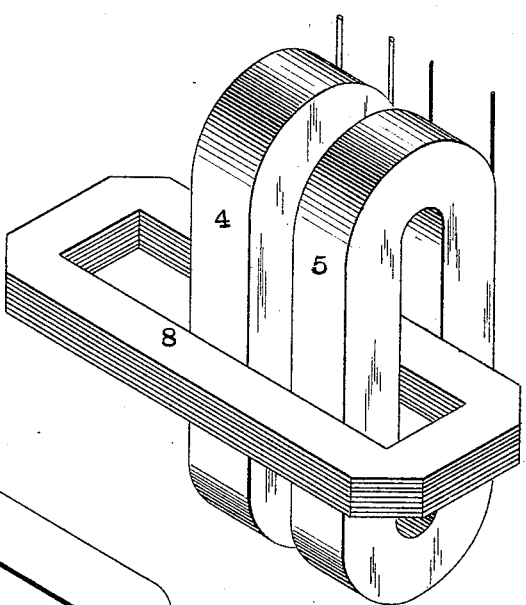
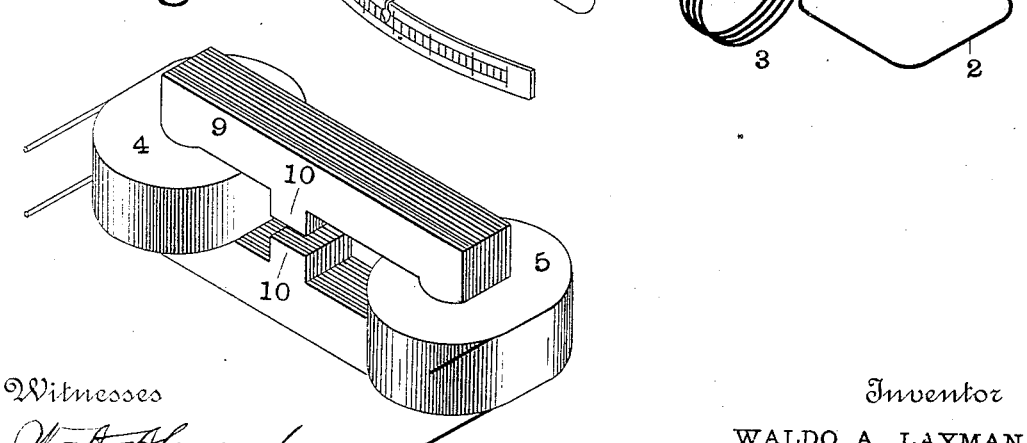
Witnesses
W. A. Alexander.
A. E. Hamilton
Inventor
WALDO A. LAYMAN.
By Attorneys
Fowler & Fowler
THE NORRIS PETERS CO., PHOTO-LITHO., WASHINGTON, D. C.

UNITED STATES PATENT OFFICE.

WALDO A. LAYMAN, OF ST. LOUIS, MISSOURI.

AMMETER FOR ALTERNATING ELECTRIC CURRENTS.

SPECIFICATION forming part of Letters Patent No. 616,339, dated December 20, 1898.

Application filed April 4, 1898. Serial No. 676,270. (No model.)

*To all whom it may concern:*

Be it known that I, WALDO A. LAYMAN, a citizen of the United States, residing at St. Louis, in the State of Missouri, have invented a certain new and useful Ammeter for Alternating Electric Currents, of which the following is such a full, clear, and exact description as will enable any one skilled in the art to which it appertains to make and use the same, reference being had to the accompanying drawings, forming part of this specification.

One object of my invention is to provide an ammeter of this class which will use as small an amount of energy of the working circuit as possible.

Another object of my invention is to so construct an ammeter in which both the fixed and movable elements are energized by a suitable current that the scale may be substantially even or uniform in its graduation.

My invention consists in an ammeter provided with suitable fixed and movable elements and having a suitable main circuit for energizing one of said elements in combination with a suitable transformer, the primary of which is in its said main circuit for energizing the other of said elements.

In the accompanying drawings, Figure 1 is a diagram illustrating an ammeter made in accordance with my invention, and Figs. 2 and 3 are isometric projections showing two forms of transformers which may be used in connection with my ammeter.

1 represents a circuit which may be either the circuit carrying the current to be measured or a circuit carrying a proportional current derived from the current to be measured. Leading from the circuit 1 is a circuit 2, which I shall term the "primary" circuit of the ammeter. In the circuit 2 are two stationary coils 3, which constitute the fixed element of the ammeter. The primary circuit 2 also contains the primary coil 4 of a transformer, the secondary coil 5 of which is contained in a secondary circuit 6. In the secondary circuit 6 is a movable coil 7, which forms the movable element of the ammeter.

The current from the circuit 1, passing through the circuit 2, energizes the stationary coils 3 and at the same time, by means of the transformer, induces a current in the secondary circuit 6, which energizes the movable coil 7. The transformer is preferably so constructed that the induced current in the secondary circuit 6 is of a higher potential or electromotive force than the current in the main circuit 2. In this way the stationary coils 3 may be made of very low resistance, so that the instrument will consume but a very small amount of the current to be measured, and at the same time a current will be provided in the secondary circuit 6 of sufficient potential to overcome the resistance of the movable coil 7, and thus supply to the movable coil 7 a current sufficient for the operation of the instrument.

The transformer may be made in two ways. It may be so made as to produce a current in the secondary circuit 6 proportional to that in the primary circuit 2. If the transformer is made in this manner, the first object of my invention will be accomplished—that is, sufficient potential will be obtained in the secondary circuit to overcome the resistance of the movable element of the ammeter without having an unduly high resistance in the main circuit. As the current in both the fixed and movable elements will vary in the same proportion in this construction, the movement of the movable element will vary as the square of the variation of the current to be measured multiplied by an angular function. An evenly-spaced scale cannot be used with this arrangement. Therefore I prefer to construct the transformer so that the current in the secondary circuit will be constant or substantially so. One way in which this object can be obtained is by providing a transformer with a core which will become magnetically saturated when a comparatively small current is flowing through the primary coil. This construction is shown in Fig. 2, where the core 8 has a comparatively small cross-section, and hence limited magnetic capacity. Another way to secure this object is to construct the transformer in such a manner that the magnetic leakage will prevent the secondary current from exceeding a certain amount. This construction is shown in Fig. 3, where the core 9 is provided with projecting pieces 10, which are in proximity, and thus allow the magnetic leakage to take place between them when the current in the secondary has reached the desired amount. As will be readily seen when this construction is used the current in the movable element will be a practically fixed quantity and only that in the fixed element will be variable, so that the movement of the said movable element will be practically proportional to the variation of the current to be measured multiplied by an angular function. This will allow the use of a scale having a uniform or substantially uniform graduation. In this arrangement, as in that first described, the potential of the secondary should be sufficient to overcome the resistance of the coil 7 and will thus supply the said coil with a current sufficient for the operation of the instrument.

I do not wish to limit myself to the arrangement illustrated in the diagram, as it is obvious that the arrangement of the circuits may be varied and that for some purposes the primary current might energize the movable element and the secondary the fixed element.

Having fully described my invention, what I claim as new, and desire to secure by Letters Patent of the United States, is—

1. In an alternating or pulsating current ammeter, a suitable fixed element, a suitable movable element, a primary circuit for one of said elements, a secondary circuit for the other of said elements, and a suitable transformer the primary coil of which is in said primary circuit for supplying current to said secondary circuit.

2. In an alternating or pulsating current ammeter, a suitable fixed element, a suitable movable element, a primary circuit for said fixed element, a secondary circuit for said movable element, and a suitable transformer the primary coil of which is in said primary circuit for supplying current to said secondary circuit.

3. In an alternating or pulsating current ammeter, a suitable fixed element, a suitable movable element, a primary circuit for one of said elements, a secondary circuit for the other of said elements, and a transformer the primary coil of which is in said primary circuit for supplying current to said secondary circuit at a higher potential than the current in the primary circuit.

4. In an alternating or pulsating current ammeter, a suitable fixed element, a suitable movable element, a primary circuit for said fixed element, a secondary circuit for said movable element, and a transformer the primary coil of which is in said primary circuit for supplying current to said secondary circuit at a higher potential than the current in said primary circuit.

5. In an alternating or pulsating current ammeter, a suitable fixed element, a suitable movable element, a primary circuit for one of said elements, a secondary circuit for the other of said elements, and a transformer for supplying current to said secondary circuit at a substantially constant potential.

6. In an alternating or pulsating current ammeter, a fixed element, a movable element, a primary circuit for said fixed element, a secondary circuit for said movable element, and a transformer for supplying current to said secondary circuit at a substantially constant potential.

In testimony whereof I have hereunto set my hand in the presence of the two subscribing witnesses.

WALDO A. LAYMAN.

Witnesses:
JOHN F. GREEN,
A. C. FOWLER.